(12) United States Patent
Lutzer et al.

(10) Patent No.: US 10,479,505 B2
(45) Date of Patent: Nov. 19, 2019

(54) SYSTEM AND METHOD FOR DISPOSING OF FLUID FROM A GALLEY SINK

(71) Applicant: Airbus Operations GmbH, Hamburg (DE)

(72) Inventors: Wilhelm Lutzer, Hamburg (DE); Matthias Reiss, Hamburg (DE); Oliver Kiehne, Hamburg (DE); Michael Kempa, Hamburg (DE); Marc Spille, Hamburg (DE); Holger Czopka, Hamburg (DE)

(73) Assignee: Airbus Operations GmbH (DE)

( * ) Notice: Subject to any disclaimer, the term of this patent is extended or adjusted under 35 U.S.C. 154(b) by 391 days.

(21) Appl. No.: 15/586,424

(22) Filed: May 4, 2017

(65) Prior Publication Data

US 2017/0320577 A1 Nov. 9, 2017

(30) Foreign Application Priority Data

May 4, 2016 (DE) .................. 10 2016 108 360

(51) Int. Cl.
*B64D 11/04* (2006.01)
*E03F 1/00* (2006.01)
(Continued)

(52) U.S. Cl.
CPC .............. *B64D 11/04* (2013.01); *E03F 1/006* (2013.01); *F16K 31/1262* (2013.01);
(Continued)

(58) Field of Classification Search
CPC ......... B64D 11/02; B64D 11/04; E03F 1/006; F16K 31/1262; F16K 31/1266
(Continued)

(56) References Cited

U.S. PATENT DOCUMENTS 3,695,284 A * 10/1972 Wallgren .................. E03D 3/06
137/188
6,012,678 A * 1/2000 Hale ...................... B64D 11/02
244/118.5
(Continued)

FOREIGN PATENT DOCUMENTS

DE 10 2006 016 030 A1 10/2007
DE 10 2011 012047 A1 8/2012
(Continued)

*Primary Examiner* — Huyen D Le
(74) *Attorney, Agent, or Firm* — Lerner, David, Littenberg, Krumholz & Mentlik, LLP

(57) ABSTRACT

A fluid-disposing system for a galley sink includes: a galley sink for a galley cabin monument, a self-regulating valve, a control unit, a sensor, and a signal connection between the sensor and the control unit. The valve input is connected to a fluid line, connected to a drainage opening of the galley sink. The valve is arranged underneath the drainage opening, such that fluid from the galley sink can flow through the associated drainage opening into the fluid line. The valve output is designed to be couplable with a source of negative pressure. The valve is designed to automatically open at a predetermined amount M1 of fluid in the fluid line, such that fluid can flow out of the fluid line, and to automatically close at a predetermined amount M2 of fluid in the fluid line, such that the predetermined amount M2 of fluid remains in the fluid line.

17 Claims, 4 Drawing Sheets

(51) Int. Cl.
*F16K 31/126* (2006.01)
*F16K 37/00* (2006.01)
*E03C 1/23* (2006.01)
*B64D 11/02* (2006.01)

(52) U.S. Cl.
CPC ...... *F16K 31/1266* (2013.01); *F16K 37/0041* (2013.01); *B64D 11/02* (2013.01); *E03C 2001/2311* (2013.01); *E03C 2001/2313* (2013.01); *E03C 2001/2317* (2013.01)

(58) Field of Classification Search
USPC .......................................................... 4/619
See application file for complete search history.

(56) References Cited

U.S. PATENT DOCUMENTS

| | | | |
|---|---|---|---|
| 6,119,283 A * | 9/2000 | Galler | B61D 35/007 137/488 |
| 6,223,361 B1 | 5/2001 | Rozenblatt | |
| 6,385,789 B1 * | 5/2002 | Pondelick | B64D 11/04 4/427 |
| 9,448,563 B2 * | 9/2016 | Goeschel | E03C 1/242 |
| 10,221,548 B2 * | 3/2019 | Stachowski | B64D 11/02 |
| 2007/0151020 A1 | 7/2007 | Pondelick | |
| 2007/0226887 A1 * | 10/2007 | Lappalainen | E03D 9/14 4/431 |
| 2013/0312853 A1 * | 11/2013 | Burd | B64D 11/04 137/535 |

FOREIGN PATENT DOCUMENTS

| | | |
|---|---|---|
| DE | 20 2011 108281 U1 | 2/2013 |
| EP | 1 866 201 B1 | 9/2008 |
| WO | 02/14148 A1 | 2/2002 |
| WO | 2015/019335 A1 | 2/2015 |

* cited by examiner

SYSTEM AND METHOD FOR DISPOSING OF FLUID FROM A GALLEY SINK

FIELD OF THE INVENTION

The invention relates to a system for disposing of fluid from a galley sink, a method for controlling such a system as well as a vehicle with such a system.

BACKGROUND OF THE INVENTION

In common aircraft, grey water, i.e. water from sinks and galleys, may be discharged overboard through a so-called "drain mast", which is a heated nozzle at the bottom side of the aircraft fuselage, if they are suitable for this. Contrary to this, black water, which is wastewater from the toilets of the aircraft, is collected in a so-called "waste tank" or wastewater collection tank and is eventually disposed of on ground. For conveying the black water into the wastewater collection tank, the aircraft comprises a source of negative pressure, which generates a negative pressure at a lavatory, in order to suction the arising wastewater of and to suction it into the wastewater collection tank through the negative pressure. During the suctioning of arising wastewater of a toilet on board, noise emissions may occur. Due to these noise emissions it is refrained from using a source of negative pressure for suctioning grey water into the wastewater collection tank, since respective noise emissions are to be prevented in particular in the galley.

BRIEF SUMMARY OF THE INVENTION

The invention is based on an idea of providing a system and a method for disposing of fluid from a galley sink of an aircraft, which allows the disposal of wastewater arising in the galley sink through suctioning through negative pressure and collection in a wastewater collection tank.

A system for disposing of fluid, in particular wastewater, from a galley sink of an aircraft is proposed. The system comprises: a galley sink for a galley cabin monument of a vehicle, a self-regulating valve, a control unit, a sensor and a first signal connection between the sensor and the control unit. The input of the self-regulating valve is connected to a first fluid line, which is connected to a drainage opening of the galley sink at least indirectly. The self-regulating valve is arranged underneath the drainage opening of the galley sink, such that fluid from the galley sink may flow through the associated drainage opening into the first fluid line, wherein the output of the self-regulating valve is designed to be couplable with a source of negative pressure at least indirectly. Furthermore, the self-regulating valve is designed to automatically open if a predetermined, first amount of fluid is in the first fluid line, such that the self-regulating valve is in an opening state and that fluid from the first fluid line may flow through the first self-regulating valve, and to close automatically in case of a predetermined second amount of fluid in the first fluid line, such that the self-regulating valve is in a closing state and that the predetermined, second amount of fluid remains in the first fluid line as a residual fluid amount. The sensor is designed for detecting the opening state or the closing state of the self-regulating valve. Furthermore, the sensor is designed for transferring a sensor signal, which represents the detected state of the self-regulating valve, to the control unit, wherein the control unit is designed for outputting at least one control signal based on the transferred sensor signal.

A galley cabin monument of an aircraft may be referred to as a buffet or a "galley". For a respective galley cabin monument, a galley sink is provided. The galley sink may be designed in the form of a sink in order to release wastewater in it, as for example remains from a drink bottle, such as orange juice. Hence, the wastewater may also be a mixture of a fluid and a solid matter.

At an underside of the galley sink, a drainage opening is provided, through which a fluid that is released into the galley sink may automatically drain. The drainage opening of the galley sink is connected to a first fluid line at least indirectly, which leads to an input of the self-regulating valve. Preferably, the first fluid line extends from the drainage opening of the galley sink to the input of the self-regulating valve. The self-regulating valve is arranged underneath the drainage opening of the galley sink, such that a fluid supplied into the galley sink, in particular wastewater, may automatically flow through the discharge opening and the first fluid line up to the input of the self-regulating valve.

The self-regulating valve is a valve, which is designed for automatically switching between an opening state and a closing state. For this, the self-regulating valve is designed such that it automatically opens with a predetermined amount of fluid in the first fluid line, such that the self-regulating valve is in an opening state and that fluid from the first fluid line may flow through the first self-regulating valve to an outlet of the self-regulating valve. Furthermore, the self-regulating valve is designed in a way that with a predetermined second amount of fluid in the first fluid line it automatically closes, such that the self-regulating valve is in a closing state and that the predetermined, second amount of fluid remains in the first fluid line as a residual fluid amount.

Furthermore, it is provided that the outlet of the self-regulating valve is couplable with a source of negative pressure at least indirectly. If the self-regulating valve now opens in case at least the predetermined first amount of fluid is in the first fluid line, fluid may be suctioned of from the first fluid line through the first self-regulating valve. However, the fluid from the first fluid line is not suctioned of completely. The residual fluid amount rather remains in the first fluid line, if the predetermined, second amount of fluid in the first fluid line is reached, such that the self-regulating valve switches into the closing state. Hence, the predetermined second amount of fluid is smaller than the predetermined first amount of fluid. Thereby, it is efficiently prevented to suction of air through the first self-regulating valve, since the self-regulating valve is designed in a way that fluid always remains in the first fluid line above the first self-regulating valve. Thereby, respective noise emissions at the drainage opening of the galley sink are prevented efficiently.

Thus, with the system mentioned above it is possible that wastewater may at least indirectly be suctioned of from a galley sink through negative pressure and to be subsequently collected in a wastewater tank. For this reason it may be done without leading wastewater from the galley sink to the so-called "drain mast" and to discharge it at the underside of the fuselage. Resultantly, the outer side of the aircraft fuselage is not soiled by the wastewater from the galley sink, since this may now be collected in the wastewater tank and, when the aircraft is on ground, may be disposed of, without soiling the outer side of the aircraft fuselage.

Furthermore, it is provided that the system comprises a sensor. The sensor is designed for detecting a state of the self-regulating valve, i.e. in particular the opening state or the closing state of the self-regulating valve. Furthermore, the sensor is designed for transferring a sensor signal to a control unit, wherein the sensor signal represents the detected state of the self-regulating valve. The control unit is designed for outputting at least one control signal based on the transferred sensor signal. This control signal offers the feature that subsequent actions are triggered. For example, a negative pressure may be applied to the output of the self-regulating valve and/or interrupted through the control signal. This prevents that the self-regulating valve is continuously exposed to a negative pressure.

An advantageous embodiment of the system is characterized in that the system comprises a first controllable valve, whose output is designed to be couplable with a source of negative pressure for suctioning of fluid at least indirectly. Furthermore, a fluid connection between the output of the self-regulating valve and an input of the first, controllable valve is provided. In addition, the system comprises a second signal connection between the control unit and the first, controllable valve, wherein the control unit is designed to close the first controllable valve through transferring a control signal to the first, controllable valve in case and/or as soon as the self-regulating valve is in the closing state. The first controllable valve may thus be arranged between the source of negative pressure and the self-regulating valve, wherein respective fluid lines may be provided between the first, controllable valve and the self-regulating valve or between the controllable valve and the source of negative pressure, respectively. The first controllable valve may thus serve for applying a negative pressure provided by the source of negative pressure to the output of the self-regulating valve or not.

Through the sensor signal, which represents the detected state of the self-regulating valve, the information about the state of the self-regulating valve is transferred to the control unit. The control unit may now control the controllable valve, i.e. depending on the state of the self-regulating valve. Since the controllable valve is controllable, the control unit may control the controllable valve in such a manner, that it is closed if the self-regulating valve is in the closing state, through a transfer of a respective control signal. The closing of the first controllable valve may thereby be conducted as soon as the sensor signal (with the respective information) has reached the control unit. As an alternative, the control of the first controllable valve may also be delayed and/or depend on further parameters and/or signals, which are transferable to the control unit. The control unit may thus be designed for transferring a control signal to the first controllable valve based on the transferred sensor signal in order to close the first controllable valve. Hence, if the self-regulating valve automatically closes, in order to keep a residual fluid amount in the first fluid line, the control unit may be designed to also close the controllable valve, in order to remove a negative pressure from the output of the self-regulating valve. This provides the advantage that the mechanical load, in particular caused by a respective application of a negative pressure to the output of the self-regulating valve, is reduced, which extends the endurance and/or long life cycle of the self-regulating valve. Through closing the first controllable valve it is also ensured that a fluid connection between the self-regulating valve and the wastewater collecting tank is provided only when fluid from the first fluid line has to flow to the wastewater tank. Otherwise, the respective fluid connection is blocked through the first controllable valve. Thereby, an undesired back-flow of fluid from the wastewater collection tank in the direction of the first self-regulating valve or even in the direction to the galley sink, is prevented efficiently.

An advantageous embodiment of the system is characterized in that the control unit is designed for opening the first controllable valve if and/or as soon as the self-regulating valve is in the opening state through a transfer of an, in particular further, control signal to the first controllable valve. The information about the change of state into the opening state may be transferred from the sensor to the control unit through transferring the sensor signal. If this information is present at the control unit, the control unit may open the first controllable valve through the transfer of a respective control signal to the first controllable valve, such that a negative pressure, which is provided by the source of negative pressure, is present at the outlet of the self-regulating valve. This causes a suctioning of fluid out of the first fluid line. Opening the first controllable valve may thereby be conducted as soon as the sensor signal (including the respective information) has reached the control unit. As an alternative, the control of the first controllable valve may also be delayed and/or depend on further parameters and/or signals, which are transferable to the control unit. Thus, the control unit may exemplarily be designed for transferring a control signal to the first controllable valve based on the transferred sensor signal, in order to open the first controllable valve. Preferably, the suctioning of the fluid out of the first fluid line is conducted only until the self-regulating valve switches into the closing state. The information about a respective change of state may be transferred from the sensor to the control unit through the sensor signal. Thereupon, the control unit may be designed for closing the first controllable valve, as explained in conjunction with the above embodiment.

Preferably, the control unit is enabled to control the first controllable valve in analogy to the closing state of the self-regulating valve, i.e. to open or to close, through the detection of the state of the self-regulating valve and the transfer of a respective control signal, which represents the state of the self-regulating valve, to the control unit. Hereby, it is ensured in a particularly efficient manner that a negative pressure at the output of the self-regulating valve is always present only when this is actually required. This also very efficiently prevents possible noise emissions. Furthermore, a back-flow of fluid from a wastewater collection tank is prevented.

A further advantageous embodiment of the system is characterized in that a water supply faucet for supplying of water into the galley sink is provided. Furthermore, the system comprises a second controllable valve for this embodiment, which is designed for controlling a water flow to the water supply faucet. In addition thereto, a third signal connection between the control unit and the second controllable valve is provided, wherein the control unit is designed for opening the second controllable valve if and/or as soon as the self-regulating valve is in the opening state, through a transfer of an, in particular further, control signal to the second controllable valve.

The last mentioned embodiment of the system may be combined with one of the both mentioned preferred embodiments of the system above or may constitute an independent advantageous embodiment of the system according to the first aspect of the invention. Thus, for the second controllable valve, the first controllable valve is not necessarily a requirement.

The water supply faucet may exemplarily be designed in the manner of a water tap in order to let water flow out through it, which then flows into the galley sink. The second controllable valve is designed for controlling a water flow to the water supply faucet. For this, the second controllable valve may be coupled at least indirectly with a water pressure source and/or a water line supply system. If the second controllable valve opens, water may flow from the water pressure source or the water line supply system, respectively, through the second controllable valve to the water supply faucet, such that water may flow from it into the galley sink. Parallel to the second controllable valve, a manually operable valve may be present in order to let water flow into the galley sink on demand.

As explained above, the sensor of the system serves for transferring a sensor signal, which represents the detected state of the self-regulating valve. If the self-regulating valve is in the opening state corresponding to the information of the sensor signal, the control unit may be designed for controlling the second controllable valve respectively, i.e. to open or to close it by transferring a respective control signal to the second controllable valve based on this required information. In this regard it is provided that the control unit controls the second controllable valve in such a manner through transferring the respective control signal that the second controllable valve opens if and/or as soon as the self-regulating valve is in the opening state. The opening of the second controllable valve may thereby be conducted as soon as the sensor signal (including the respective information) has reached the control unit. As an alternative thereto, the control of the second controllable valve may also be delayed and/or depend from further parameters and/or signals, which are transferable to the control unit. Thus, the control unit may exemplarily be designed for transferring a control signal to the second controllable valve based on the transferred sensor signal in order to open the second controllable valve. The opening of the second controllable valve offers the advantage that the water, which flows through the water faucet into the galley sink, leads to flushing the galley sink, such that it is cleaned if the self-regulating valve is in the opening state. Hereby, the water that flows through the water supply faucet into the galley sink subsequently flows through the drainage opening of the galley sink into the first fluid line. Should noise emissions due to the suctioning of the fluid out of the first fluid line occur, these may be dampened through water that flows from the galley sink into the first fluid line at the same time. It may also be provided that the second valve is only opened when the self-regulating valve is closed again after the passing through of fluid, which is to be discharged, since fresh water and wastewater (drink remains) may be mixed and thus, in the worst case, the flushing effect may be impaired.

An advantageous embodiment of the system is characterized in that the control unit is designed for closing the second controllable valve through a transfer of an, in particular further, control signal to the second controllable valve if and/or as soon as the self-regulating valve is in the closing state. The self-regulating valve automatically switches into the closing state if a predetermined second amount of fluid is in the first fluid line. This then serves for creating a residual fluid amount in the first fluid line. For preventing that the residual fluid amount in the first fluid line is clearly increased, the control unit may be adapted for closing the second controllable valve through transferring a respective control signal. Hereby, it is efficiently prevented that additional water flows into the galley sink through the water supply faucet, which may lead to increasing the residual fluid amount. However, this is kept at a minimum through the transfer of a respective control signal to the second controllable valve. The closing of the second controllable valve may thereby be conducted as soon as the sensor signal (including the respective information) has reached the control unit. As an alternative thereto, the control of the second controllable valve may also be delayed and/or depend on further parameters and/or signals, which are transferable to the control unit. Thus, the control unit may exemplarily be designed for transferring a control signal to the second controllable valve based on the transferred sensor signal, in order to close the second controllable valve.

A further advantageous embodiment is characterized in that the control unit is designed to close the second controllable valve after the expiration of a delay time following the detected closing state of the self-regulating valve through a transfer of an, in particular further, control signal to the second controllable valve. This offers the advantage that the second controllable valve is not closed directly after the change of state of the self-regulating valve from the opening state into the closing state. Rather, the closing of the second controllable valve is accomplished after the expiration of a delay time following the change of state of the self-regulating valve. The delay time may be predetermined for this. With the predetermining of the delay time, a predetermined amount of water may be predetermined, which still flows into the galley sink after the state transition of the self-regulating valve, such that it may be ensured that the residual fluid amount in the first fluid line comprises a minimum part of water, in particular fresh water from the water supply faucet. This efficiently prevents, that deposits occur in the first fluid line, such that blockages in the first fluid line may be prevented efficiently.

A further advantageous embodiment of the system is characterized in that the system comprises an input unit, in particular having a push-button. Furthermore, a signal connection between the input unit and the control unit is provided, wherein the control unit is controllable through the input unit in a way to open or close the first controllable valve and/or to open or close the second controllable valve.

The input unit, in particular the push-button, may be assigned to the galley cabin monument of the aircraft. By operating the input unit or the push-button, respectively, a control signal may be generated, which is transferred to the control unit through the respective signal connection. Based on this control signal, the control unit may control the first and/or the second controllable valve. Furthermore, a controllable actuator may be assigned to the self-regulating valve, the actuator being designed for opening the self-regulating valve. The self-regulating valve may thus be opened independently of the fluid amount in the first fluid line through the actuator. Furthermore, it is preferably provided that the control unit is connected to the actuator through a signal connection, in order to transfer control signals to the control unit, such that the self-regulating valve is openable controlled by the control unit. For this, the control unit may be designed in such a manner that the control unit controls the actuator based on the control signal of the input unit. In other words, the control unit is preferably controllable through the input unit in a way to open the self-regulating valve through the assigned actuator. Hence, the input unit may be used for accomplishing a manual suctioning of fluid out of the first fluid line. This design offers the advantage that, if the aircraft is exemplarily on ground, the residual fluid amount is suctionable out of the first fluid line in order to prevent that deposits and/or a blockage in the first fluid line occur.

A further advantageous embodiment of the system is characterized in that the control unit is designed for receiving an instruction signal from a superordinate supervising unit, wherein the control unit is controllable based on the instruction signal in order to open or close the first controllable valve and/or in order to open or close the second controllable valve. Preferably, the control unit is designed to send a control signal to the first controllable valve based on the instruction signal in order to open or to close it. Furthermore, the control unit may be designed for transferring an in particular further control signal to the second valve based on the instruction signal in order to open or to close it. It is possible to open or close, respectively, the first and/or second valve as the superordinate supervising unit may send an instruction signal to the control unit, which may be evaluated by the control unit. It is referred to the above explanations to the preferred control unit of the self-regulating valve in analogy to this. Thus, the control unit may be designed in such a manner that the control unit controls the actuator based on the instruction signal. In other words, the control unit is preferably designed in order to open the self-regulating valve through the associated actuator based on the instruction signal. This is advantageous if the aircraft is exemplarily on ground and if it shall be ensured that no residual fluid remains in the first fluid line. In this case, opening the first valve may be accomplished exemplarily through the instruction signal, such that a respective residual fluid amount is suctioned from the first fluid line.

In advantageous embodiment, the self-regulating valve comprises a check valve directly upstream of the outlet, which check valve comprises a seal seat that is closable through a float ball and is adapted for preventing a back-flow of a fluid from the outlet to the inlet of the self-regulating valve. The check valve may be an independent check valve or may constitute a respectively designed section of the self-regulating valve. The integration of such a check valve may lead to a further improved sealing action of the self-regulating valve in certain operating states. In particular, oscillation phenomena on a component that closes the self-regulating valve for discharging a fluid may be eliminated in order to suppress the noise that thereby occurs, for example.

In a further advantageous embodiment, the check valve comprises a selectively releasable tensioning device, which exerts an additional holding force onto the floating ball in direction of the seal seat. The tensioning device is preferably dimensioned in such a manner that the additionally exerted holding force presses the floating ball onto the seal seat just as firmly that with a minimum pressure difference between the inlet and the outlet of the self-regulating valve a flowing off of fluid through the check valve is possible. Through the pressing of the floating ball onto its seal seat, all back-flows through the outlet of the self-regulating valve in direction of the inlet may be prevented. If, however, a sufficient differential pressure between both sides of the self-regulating valve is present and if a certain fluid amount is present in the inlet, such that the opening state is reached, the holding force of the floating ball may be overcome. The minimum pressure difference may exemplarily be in the region of 0.05 bar. The tensioning device may furthermore be released selectively in order to substantially eliminate the holding force. This is reasonable in order to conduct a drainage of the valve during the stay on ground or the such. Fluid, which is present in the self-regulating valve will then be discharged through the outlet without further ado. This may be reasonable before leaving the aircraft on ground in case icing of such fluid remains must be considered. For discharging the fluid, which is present in the input of the self-regulating valve, the lifting of a floating piston into an opening position is advantageous.

The tensioning device may be realized through different manners. These may for example include magnetic, electromagnetic, pneumatic or electrically operable devices, which are suitable for exerting a holding force onto the floating ball and to release it on demand.

According to a second aspect, the object mentioned at the beginning is met by an aircraft, which comprises a system as explained above. Hereby, the system may be designed according to the first aspect and/or at least one of the advantageous embodiments explained for this purpose. In this context it is referred to the above explanations, preferred embodiments, preferred features, effects and/or advantages in analogy.

According to a third aspect of the invention, the object mentioned at the beginning is met by a method. The method serves for controlling a system as explained above. As long as the system is included in the vehicle, the method may also serve for controlling the system of the vehicle. The method comprises the steps: detecting the state of the self-regulating valve and transferring the control signal from the sensor to the control unit, wherein the sensor signal represents the detected state of the self-regulating valve. This offers the advantage that the control unit may trigger a subsequent action depending on the sensor signal and thus depending on the state of the self-regulating valve. Such a subsequent action may exemplarily be the generation of a control signal for the first and/or second controllable valve.

An advantageous embodiment of the method is characterized by the step of: closing the first controllable valve through transferring a control signal from the control unit to the first controllable valve if and/or as soon as the self-regulating valve is in the closing state. Thus, the method may be adapted to close the first valve if the first self-regulating valve automatically closes. It is referred to the above explanations, preferred embodiments, effects and/or advantages in connection with the closing of the first controllable valve in analogy.

An advantageous embodiment of the method is characterized by the step of: opening the first controllable valve through transferring a control signal from the control unit to the first controllable valve if and/or as soon as the self-regulating valve is in an opening state. Thus, the first controllable valve may be opened in analogy to the self-regulating valve. It is referred to the above explanations, preferred embodiments, effects and/or advantages in connection with the opening of the first controllable valve in analogy.

An advantageous embodiment of the method is characterized by the following step: opening the second, controllable valve through transferring an in particular further control signal from the control unit to the second controllable valve if and/or as soon as the self-regulating valve is in the opening state. Thus, the method may be adapted to open the second controllable valve in analogy to the change of state of the self-regulating valve, such that water may flow through the water faucet into the galley sink. It is referred to the above explanations, preferred embodiments, preferred features, effects and/or advantages in connection with the opening of the second controllable valve in analogy.

A further advantageous embodiment of the method is characterized through the following step: closing the second, controllable valve through transferring an, in particular further, control signal from the control unit to the second controllable valve if and/or as soon as the self-regulating valve is in the closing state. Thus, the method may be adapted to close the second controllable valve through the control unit in analogy to the change of state of the self-regulating valve, if it switches into the closing state. It is referred to the above explanations, preferred embodiments, preferred features, effects and/or advantages in connection with the closing of the second, controllable valve in analogy.

A further advantageous embodiment of the method is characterized by the following step: closing the second, controllable valve after the expiration of a delay time following the acquired closing state of the self-regulating valve i.e. through transferring of an, in particular further, control signal from the control unit to the second controllable valve. This offers the advantage that an amount of water may still flow through the water faucet into the galley sink, before the second valve closes. It is referred to the above explanations, preferred embodiments, preferred features, effects and/or advantages in connection with the delayed closing of the second controllable valve in analogy.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION

Figure 1:
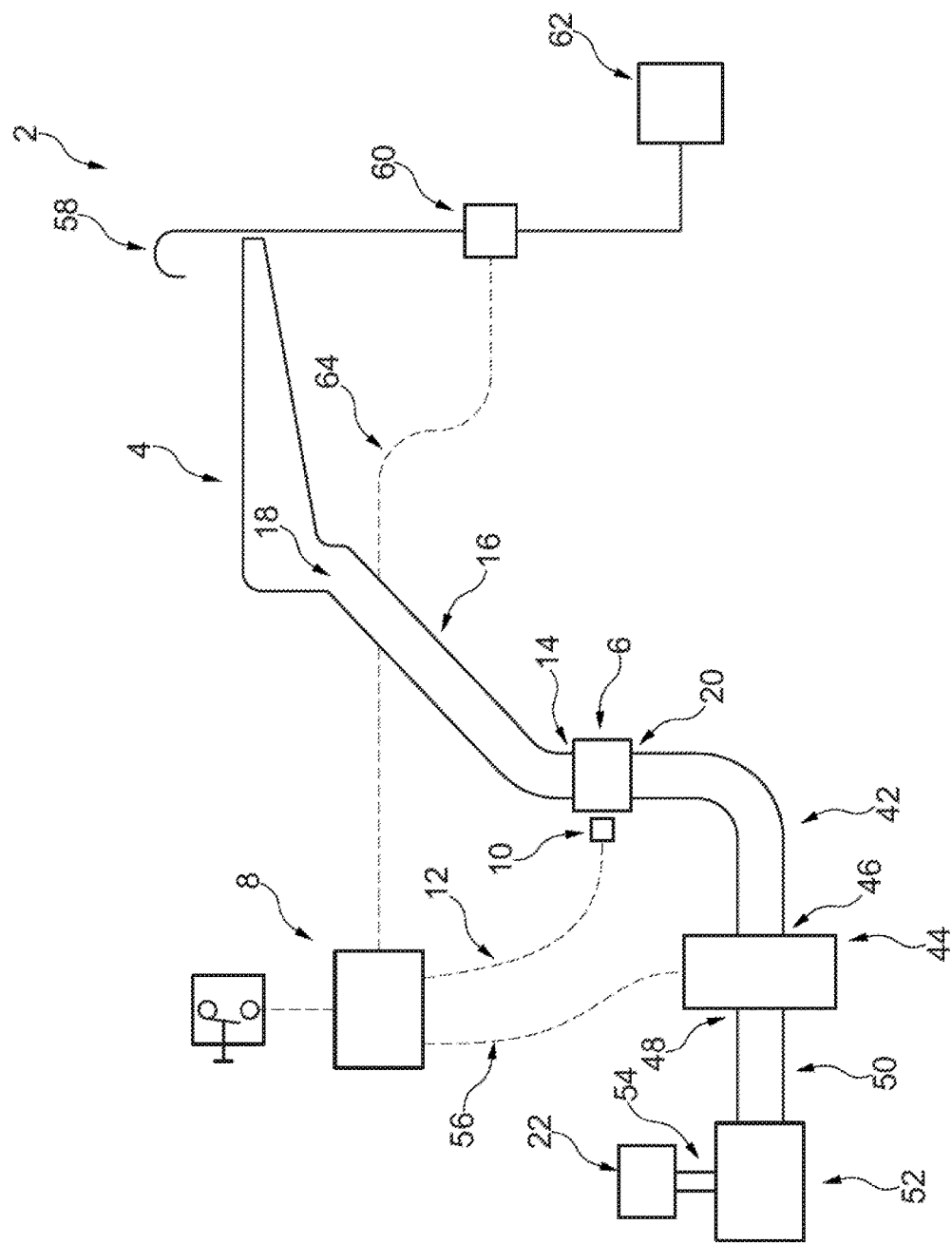
FIG. 1 shows a schematic setup of the system.

In FIG. 1, an advantageous embodiment of the system 2 is shown schematically. The system 2 comprises a galley sink 4. The galley sink 4 may be designed in the way of a kitchen sink. The galley sink 4 may constitute a part of a galley cabin monument for a vehicle. Hence, the system 2 may comprise the galley sink 4 of a galley cabin monument of a vehicle. In this case, the system 2 may be comprised by the vehicle or the galley cabin monument of a vehicle. The galley sink 4 serves for receiving of fluid, in particular liquid wastewater. For example, remains from drink bottles and/or drink cans may be poured into the galley sink. The galley sink, however, preferably serves for receiving of liquids, but also solid matter may be mixed into these liquids. The galley sink 4 comprises a drainage opening 18. The drainage opening 18 is connected with an input 14 of a self-regulating valve 6 through a first fluid line 16.

In the following, an exemplary setup and/or an exemplary functional principle of the self-regulating valve 6 shall be explained, which may exemplarily be used for the system 2. However, other designs of the self-regulating valve are possible.

Figure 2:
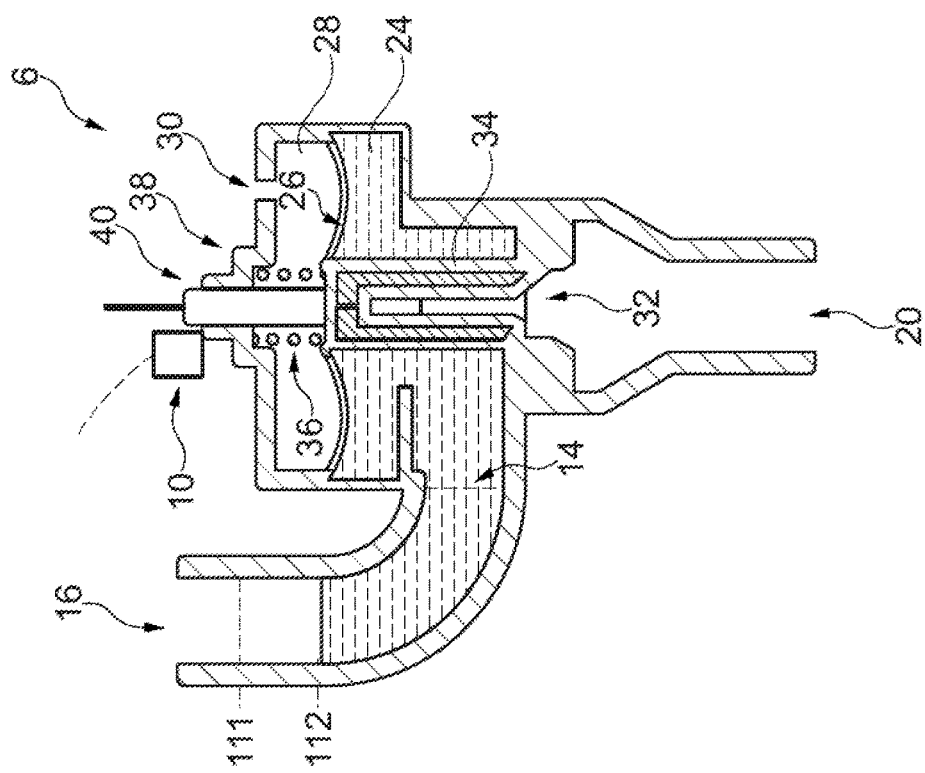
FIG. 2 shows an exemplary design of a self-regulating valve in a schematic cross-sectional view.

In the FIG. 2, an exemplary embodiment of the self-regulating valve is shown in a schematic cross-sectional view. The self-regulating valve 6 comprises an input 14 and an output 20. The input 14 of the self-regulating valve 6 is connected with the first fluid line 16, such that fluid, in particular liquid, may flow from the galley sink 4 through the drainage opening 18 and afterwards through the first fluid line 16 into the input 14 of the self-regulating valve 6. For this, the self-regulating valve 6 is arranged underneath the drainage opening 18 of the galley sink 4. The self-regulating valve 6 is designed for automatically switching between a closing state, as shown in FIG. 2, and an opening state, as shown in FIG. 3.

If fluid, in particular liquid, flows through the input 14 into the self-regulating valve 6, the fluid initially reaches a first chamber 24 of the self-regulating valve 6. The first chamber 24 is separated from a second chamber 28 of the self-regulating valve 6 through a membrane 26, which acts as a membrane-like separation wall. The second chamber 28 is coupled with the ambient air to the self-regulating valve 6 through a first channel 30. At the side of the first chamber 24 that faces away from the membrane 26, an outflow opening 32 is provided, which acts as connection channel to the output 20 of the self-regulating valve 6. Furthermore, the self-regulating valve 6 comprises a piston 34. The piston 34 is mechanically connected to the membrane 26 and extends from the membrane 26 in the direction of the outflow opening 32 within the first chamber 24. Hereby, the membrane 26 and the piston 34 are designed that the piston 34 releases the outflow opening 32, such that the self-regulating valve 6 is in an opening state, if a predetermined, first amount M1 of fluid or more is in the first fluid line 16. The predetermined first amount M1 of fluid is indicated by a respective level marking in FIG. 2.

Figure 3:
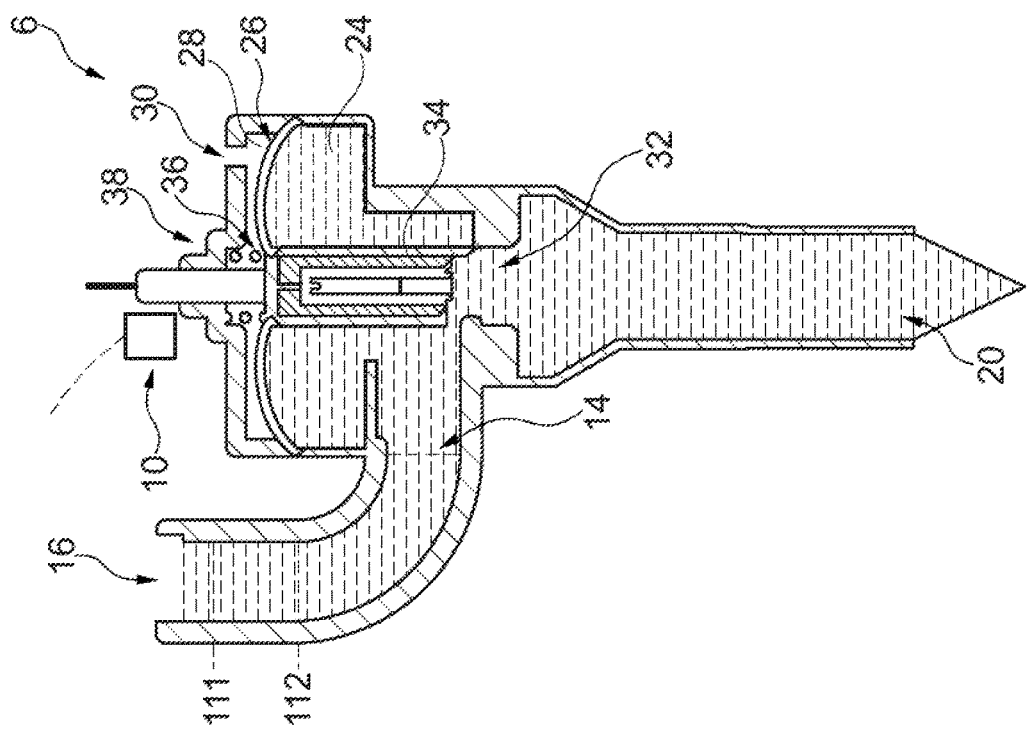
FIG. 3 shows a further exemplary design of a self-regulating valve in a schematic cross-sectional view.

In FIG. 3, the self-regulating valve 6 of FIG. 2 is illustrated, wherein in the first fluid line 16, an amount of fluid is present, which is greater than the predetermined first amount M1 of fluid. Thus, the self-regulating valve 6 automatically opens and therefore is in the opening state. Upon reaching the predetermined first amount M1 in the first fluid line 16, the pressure in the first chamber 24 rises so far that the membrane bulges so far in the direction of the second chamber 28 that the piston 34, which is connected to the membrane 26, is moved away from the outflow opening 32 and thereby releases the outflow opening 32 from the first chamber 24 to the output 20. Now, liquid may flow from the first fluid line 16 through the first chamber 24 and the outflow opening 32 to the output 20 of the self-regulating valve 6. Thereby, the amount of fluid in the first fluid line 16 decreases.

If the amount of fluid in the first fluid line 16 decreases to a predetermined second amount M2 of fluid, the self-regulating valve automatically closes, such that the self-regulating valve 6 is in the closing state, as shown in FIG. 2. Caused by the outflow of fluid from the output 20 of the self-regulating valve 6, the fluid level in the first fluid line 16 decreases, such that also a respective pressure in the first chamber 24 is reduced. At the side of the membrane 26 opposite to the piston, a spring 36 extends to an opposite housing wall 38 of the self-regulating valve 6. If the spring force onto the membrane 26, which is caused by the spring 36, exceeds a force that is caused by the fluid in the first chamber 24 onto the membrane 26, the membrane 26 assumes a position that is bulged in the direction of the first chamber 24. This causes a motion of the piston 34 in the direction of the outflow opening 32 such that the piston 34 closes the outflow opening 32. Depending on the amount of fluid in the first fluid line 16, the pressure in the first chamber 24 changes accordingly, such that the self-regulating valve 6 is designed through the membrane 26, the spring 36 and the piston 34 to automatically switch between the opening state and the closing state. For this reason, the valve is also referred to as self-regulating valve 6.

The above explanations of the self-regulating valve 6 are exemplarily valid for one of many options for designing a respective self-regulating valve 6. It is therefore provided for the system 2 that the self-regulating valve 6 is designed in such a manner that with a predetermined first amount M1 of fluid in the first fluid line 16 it automatically opens, such that the self-regulating valve 6 is in an opening state and fluid may flow from the first fluid line 16 through the first self-regulating valve 6 and that, with a predetermined second amount M2 of fluid in the first fluid line 16, it may automatically close, such that the self-regulating valve 6 is in a closing state and the predetermined second amount of fluid remains in the first fluid line 16 as a residual fluid amount. Thereby, it is intended that the predetermined second amount M2 of fluid is smaller than the predetermined first amount M1 of fluid.

Furthermore, a sensor 10 is provided for the system 2. The sensor 10 is schematically shown in FIGS. 2 and 3. The sensor 10 is designed for detecting a state, in particular the opening state or the closing state, of the self-regulating valve 6. For this, the sensor 10 may be arranged and/or be designed in a manner in order to detect the position of the piston 34 or a piston rod 40 connected therewith in order to detect the state of the self-regulating valve 6 therefrom.

For the system, also a control unit 8 is provided. The sensor 10 and the control unit 8 are connected to each other through a first signal connection 12. This signal connection 12 may be designed in the manner of a signal line connection or in the manner of a telemetrical signal connection. Furthermore, the sensor 10 is designed for transferring a sensor signal, which represents the detected state of the self-regulating valve 6, to the control unit 8. Hence, the control unit 8 receives the respective information about the self-regulating valve 6 if this is in the opening state or in the closing state. The control unit 8 is preferably designed for evaluation of the sensor signal. Based on the transferred sensor signal, the control unit 8 is therefore designed for outputting at least one control signal. The control signal may represent a control command for opening and/or closing a valve.

Furthermore, it is provided that the output 20 of the self-regulating valve 6 is designed to be couplable with a source of negative pressure 22 at least indirectly. For a preferred design it is provided that the output 20 of the self-regulating valve 6 is connected with a first controllable valve 44 through a second fluid line 42. Hereby, the second fluid line 42 may extend from the output 20 of the self-regulating valve 6 to an input 46 of the first controllable valve 44. An output 48 of the first controllable valve 44 may be connected to a source of negative pressure 22 at least indirectly. Preferably, it is provided that the system 2 comprises a wastewater collection tank 52, wherein a third fluid line 50 or a fluid line network extends between the output 48 of the second controllable valve 44 and the wastewater collection tank 52. The wastewater collection tank 52 may furthermore be connected to the source of negative pressure 22 through at least one further fluid line 54. Thereby, a negative pressure, which is provided by the source of negative pressure 22, may act on the wastewater collection tank 52 and thus onto the output 48 of the second controllable valve through the third fluid line 50 or a respective fluid line network. The wastewater collection tank 52 may furthermore serve for collecting wastewater from a lavatory of the aircraft. In order to prevent that possible odours and/or wastewater may flow from the wastewater collection tank 52 to the self-regulating valve 6 or even to the galley sink 4 it is preferably provided that the control unit 8 is connected to the first controllable valve 44 through a second signal connection 56. By the second signal connection 56, the first controllable valve 44 may be controlled by the control unit 8 through transferring a respective control signal. Thereby, it is provided that the control unit 8 is designed to close the first controllable valve 44 as soon as the self-regulating valve 6 is in a closing state through a respective transfer of a control signal to the first controllable valve 44. Furthermore, it is preferably provided that the control unit 8 is designed to open the first controllable valve 44, as soon as the self-regulating valve 44 is in the opening state through transfer of an, in particular further, control signal to the first controllable valve 44.

If the amount of fluid in the first fluid line 16 rises to a predetermined first amount M1 of fluid, the self-regulating valve 6 opens. Then, the self-regulating valve 6 is in the opening state. This is detected by the sensor 10 and a respective sensor signal is transferred to the control unit 8. In response thereto, the control unit 8 sends a control signal to the first controllable valve 44, such that it opens. Thereby, a negative pressure, which is provided by the source of negative pressure 22, is provided at the output 20 of the self-regulating valve 6, which leads to a flow of fluid through the first self-regulating valve 6. If the amount of fluid in the first fluid line 16 decreases to the predetermined second amount M2 of fluid, the self-regulating valve 6 closes. Thus, the predetermined second amount M2 of fluid is smaller than the predetermined first amount M1 of fluid. Then, the self-regulating valve 6 is in the closing state. The sensor 10 detects this closing state and sends a respective sensor signal to the control unit 8. In response thereto, the control unit 8 sends a respective control signal to the first controllable valve 44, such that it closes. The previously explained process offers the advantage that the fluid connection between the wastewater collection tank 52 and the self-regulating valve 6 or the wastewater collection tank 52 and the galley sink 4, respectively, is only provided if fluid flows from the first fluid line 16 and afterwards through the second fluid line 42 and the first controllable valve 44 in the direction of the wastewater collection tank 52. In contrast, the fluid connection through the first controllable valve 44 is immediately closed when also the first self-regulating valve 6 closes. Thereby, a residual amount of fluid remains, i.e. the residual fluid amount, in the first fluid line 16. By closing the first controllable valve 44 immediately after or with the self-regulating valve 6 it is prevented, that a fluid or odours may flow back to the galley sink 4. This particularly applies for wastewater from the wastewater collection tank 52, which may partially stem from a lavatory of the vehicle. Thereby, the system 2 offers the advantage that the galley sink 4 is particularly safe and in particular odour safe and/or back-flow safe for being couplable with a wastewater collection tank 52 at least indirectly, which is also serving for collection of wastewater of a lavatory.

For a further advantageous embodiment of the system, a water supply faucet 58 for supplying water, in particular fresh water, into the galley sink 4 is provided. The water supply faucet 58 may be designed in the manner of a bent tube and/or a water tap. Hence, water that flows from the water supply faucet 58 reaches the galley sink 4. The water that flows in serves for flushing and/or cleaning the galley sink 4. Afterwards, the water flows through the drainage opening 18 into the first fluid line 16.

Furthermore, a second controllable valve 60 is provided for the system 2. The second controllable valve 60 is designed for controlling a water flow to the water supply faucet 58. Thereby, the second controllable valve may be connected to a water source 62 at least indirectly. Thus, the second controllable valve 60 may be arranged between a pipeline network, which serves for supplying of water, and the water supply faucet 58 and/or be integrated therein, such that the second controllable valve 60 may control a water flow from the water source 62 to the water supply faucet 58. In addition thereto, a third signal connection 64 is provided between the control unit 8 and the second controllable valve 60. Furthermore, the control unit 8 is designed to open the second controllable valve 60 through a transfer of an, in particular further, control signal to the second controllable valve 60, as soon as the self-regulating valve 6 is in the opening state. This offers the advantage that water may flow into the galley sink 4 through the water faucet 58, if fluid is suctioned out of the first fluid line 16. For preventing that noise emissions caused by the suctioning are emitted through the first fluid line 16 and afterwards through the drainage opening 18 from the galley sink 4 into the environment, the second controllable valve 60 is opened by the control unit 8, such that during the suctioning of fluid out of the fluid line 16 water may flow into the galley sink 4 and afterwards through the drainage opening 18 into the first fluid line 16. Through this followingly flowing water, possible noise emissions are strongly dampened or even prevented from emitting from the galley sink 4 at all. In addition thereto, the followingly flowing water offers the advantage that the galley sink 4 is frequently flushed and/or that the residual fluid amount in the first fluid line 16 comprises at least a part of water, in particular fresh water, such that possible deposits at an inner wall of the first fluid line 16 and/or even blockages are efficiently prevented or reduced.

For limiting the residual fluid amount in the first fluid line 16 it is preferably provided that the control unit 8 is designed to close the second controllable valve 60 through a transfer of an, in particular further, control signal to the second controllable valve 60, as soon as the self-regulating valve 6 is in the closing state. Thus, the supply of water from the water supply faucet 58 is finished, as soon as the self-regulating valve 6 is in the closing state. Thereby, water that is collected in the galley sink 4 in the meantime may flow through the drainage opening 18 into the first fluid line 16, which offers the previously explained advantage.

According to a further advantageous embodiment it is provided that the control unit 8 is designed for closing the second controllable valve 60 after the expiration of a delay time after the detected closing state through a transfer of an, in particular further, control signal to the second controllable valve 60. This embodiment may preferably be an alternative embodiment to the previously explained embodiment of the system 2. By closing the second controllable valve 60 with a time delay, a further amount of water may flow from the water supply faucet 58 into the galley sink 4 after the self-regulating valve 6 is closed. Through the predetermined choice of the time delay it may be ensured that a predetermined amount of water flows from the water supply faucet into the first fluid line 16, after the first self-regulating valve 6 is closed. This leads to a further flushing effect in the first fluid line 16 and may support the increase of the fresh water part of the residual fluid amount in the first fluid line 16. This further improves the trouble-free use of the system 2.

For a further advantageous embodiment, the system 2 comprises an input unit 66. The input unit 66 may comprise a push-button. In this regard, the input unit 66 may be assigned to the galley cabin monument of the vehicle. Thus, the personnel of the aircraft may generate a control signal through operating the input unit 66, in particular of an associated push-button. The input unit 66 is connected to the control unit 8 through a further signal connection 68. Hence, the control unit 8 is controllable through the input unit 66, preferably through transferring a signal, which represents an input at the input unit 66. Thereby, the control unit 8 is controllable through the input unit 66, or through a signal generated by the input unit 66, in a manner to control the first controllable valve 44 and/or the second controllable valve 60. In doing so, the first or the second controllable valve 44, 60 may be opened and/or closed based on the input at the input unit 66. For example, the first controllable valve 44 may be opened through the input unit 66, in order to suction the residual fluid amount out of the first fluid line 16. Furthermore, the second controllable valve 60 may be opened, in order to manually initiate a water supply through the water faucet 58 into the galley sink 4. The input unit 66 may exemplarily be used for flushing the fluid leading parts of the system 2 and/or to clean them, if the aircraft is on ground.

A further advantageous embodiment of the system 2 is characterized in that the control unit 8 is designed for receiving an instruction signal from a superordinate supervising unit (not shown), wherein the control unit 8 is controllable based on the instruction signal in a way to open or to close the first controllable valve 44 and/or to open or to close the second controllable valve 60. In analogy to the input unit 66 and a signal generated therefrom, a respective instruction signal may be generated by the supervising unit, exemplarily if the aircraft is on ground, in order to conduct a cleaning of the fluid leading parts of the system 2.

Figure 4:
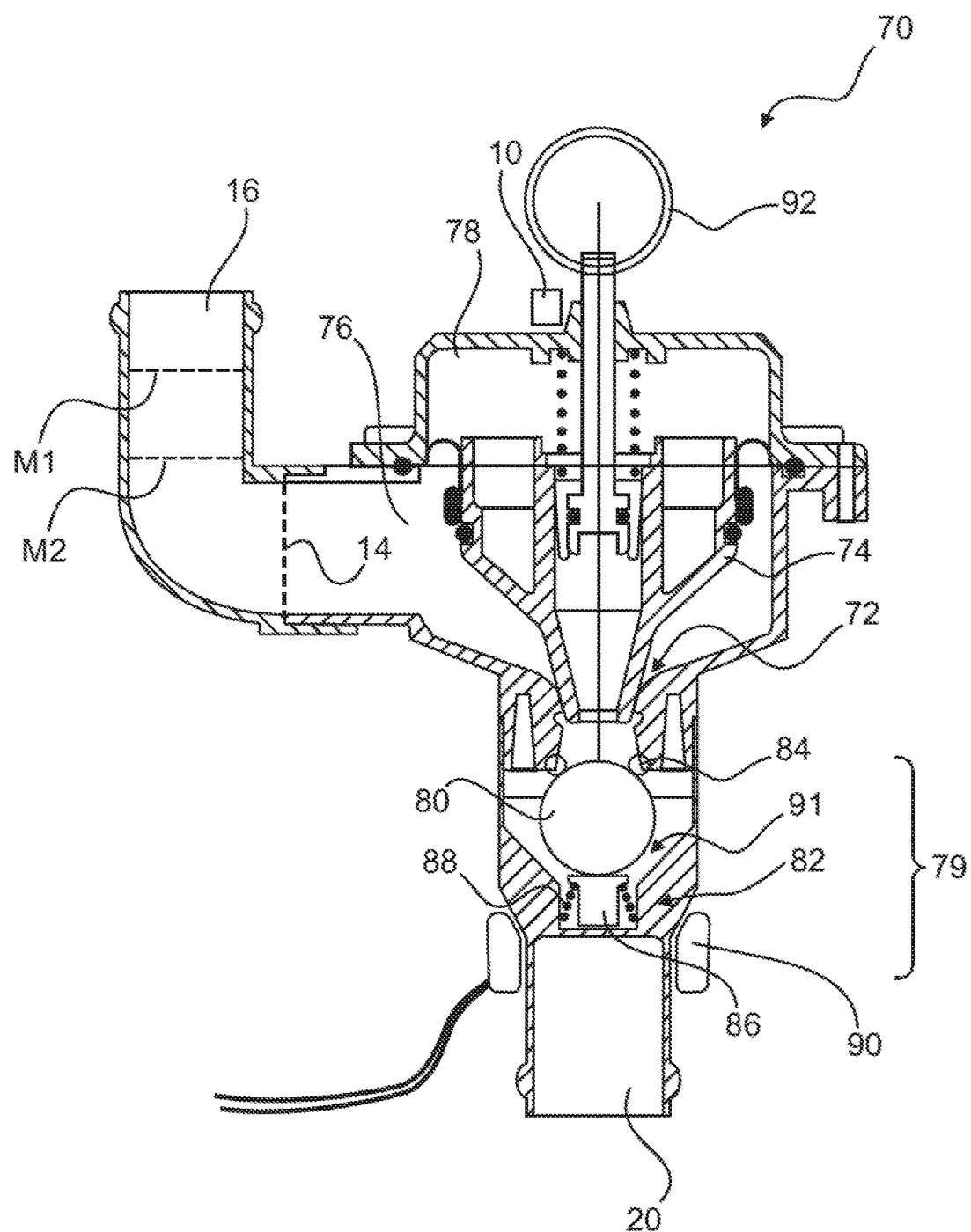
FIG. 4 shows a further exemplary design of a self-regulating valve in a schematic cross-sectional view.

FIG. 4 shows a further exemplary embodiment of a self-regulating valve 70, which is slightly modified in comparison to the self-regulating valve 6 in FIGS. 2 and 3. The self-regulating valve 70 comprises a first drainage opening 72, which is closable through a floating piston 74, in analogy to the explanations of FIGS. 2 and 3. If fluid from a first fluid line 16 reaches a first chamber 76 of the self-regulating valve 70, the piston 74 is moved upwards against the force exerted by the spring 36, if the fluid in the first fluid line reaches the limit level M1. The first outflow opening 72 is thereby released and fluid may flow off the first chamber 76 through the first outflow opening 72.

Preferably, the spring 36 has such a spring constant that allows to open the piston 74 already at relatively low pressure differences between the first chamber 76 and a second chamber 78 above the piston 74. Thereby, a reliable function is ensured, through which fluid, which is accumulated in the first fluid line 16, may reliably be discharged through the first outflow opening 72. Due to the relatively low spring force of the spring 36, which acts on the piston 74, oscillation phenomena during the motion of the piston 74 may occur in close region of the closing state of the self-regulating valve 70. For a further improvement of the closing action of the self-regulating valve 70 and for a further improvement of the prevention of a back-flow from a vacuum system downstream of the output 20 into the first fluid line 16, a check valve 70 may be provided, which in the illustrated case is an integral component of the self-regulating valve 70.

The check valve 79 comprises a floating ball 80, which is positioned underneath the first outflow opening 72. The floating ball 80 is pressed against a seal seat 84, which is directly underneath the first outflow opening 72, through a tensioning device 82, such that the function of the check valve is achieved.

In the shown example, the tensioning device 82 is designed with a holding stamp 86, a second spring 88 and a magnet device 90 in a concentric arrangement. The holding stamp 86 is pressed through the second spring 88 onto the floating ball 80 at a side of the floating ball 80 opposite to the seal seat 84 in the direction of the first outflow opening 72.

The force of the second spring 88 is adapted to this scenario for a pressure difference between the input and the output 20 of the self-regulating valve 70, such that a safe discharge of the fluid is not impaired. However, the holding force of the second spring 88 has to be so great that a back-flow between the output 20 and the input 16 is also reliably prevented and that the mentioned oscillation phenomena are reduced or the noises generated through a connection to a vacuum system thereby are eliminated.

The permanent pressing of the floating ball 80 onto the seal seat 84 would, however, prevent a full drainage of the self-regulating valve 70 on ground, if an insufficient negative pressure between the input and the output 20 is present. In order to still achieve this function, the tensioning device 82 is adapted to assume a first tensioning state and a second tensioning state. In the first tensioning state, a predefined force onto the floating body 80 in direction of the seal seat 84 is exerted. In the second tensioning state, a force acting in direction of the seal seat 84 is substantially eliminated, such that the floating ball 80 is released. Depending on the design of the tensioning device 82, this may be accomplished through different means.

Exemplarily, the magnet device 90 may be designed in combination with the holding stamp 86 in such a way, that it permanently exerts a force onto the holding stamp 86, in order to firmly press the holding stamp 86 onto the floating ball 80. Preferably, the magnet 90 may be designed such that by applying an electrical voltage the force exerted by the magnet 90 and the spring is substantially cancelled. If, with lacking differential pressure, a flushing of the self-regulating valve 70 is initiated, an electrical voltage may be applied to the magnet device 90. In such an operating state of the aircraft this may be conducted manually or automatically during detecting the lifting of the piston 74 through a sensor 10 in analogy to the FIGS. 2 and 3 through a control unit. For lifting the piston 74, exemplarily a ring 92 may be attached to it.

Of course, the tensioning device 82 may be realized completely differently. For example, electrical or pneumatic actuators are mentioned, wherein electrical actuators may exemplarily be realized through stepping motors.

The function of the self-regulating valve 70 for the individual expected operating states may be realized as following. During the flight of the aircraft having an equipment exemplarily according to FIG. 1, a sufficient differential pressure between the input and the output 20 is present, such that the self-regulating valve 70 conducts a discharge of a fluid from the first fluid line when reaching a minimum level Ml. Thereby, the piston 74 is lifted through the fluid that flows into the first chamber 76, such that the fluid flows through the first outflow opening 72 in the direction of the floating ball 80. Due to the sufficient differential pressure during flight, the floating ball 80 opens and lets fluid pass through a second outflow opening 91. After the fluid has passed and when the level M2 is reached again, the piston 74 closes and consequently does not let air flow through the first outflow opening 72. Since no further flow of the fluid happens, afterwards also the floating ball 80 closes by being pressed onto its seal seat 84.

If the aircraft is on ground and if a negative pressure is applied on the output 20, the function of the valve 70 is as mentioned above for the flight as the operating state. This presumes that the differential pressure between the input 16 and the output 20 is sufficient.

If during the stay on ground of the aircraft, a sufficient differential pressure is not present, the piston 74 is in fact lifted with fluid present in the fluid line 16 and lets fluid flow to the floating ball 80. However, the fluid cannot pass the floating ball 80.

If this is desired, exemplarily during the drainage for achieving an icing protection, the tensioning device 82 is controlled in such a way that the holding stamp 86 releases the floating ball 80 and consequently the fluid may pass the floating ball 80 pressure-less. Since in this case the floating ball 80 is not held by the tensioning device 82 or is not pressed against the seal seat 84, respectively, it is normally opened. With a possible initiation of a back-flow of fluid to the input it would immediately float up and thereby automatically close the seal seat 84.

In addition hereto, a further function may be integrated, which may prevent a sticking of the valve. After each use of the self-regulating valve 70, a short following flushing with fresh water may happen. For this, a flushing process must be detected. It may be assumed that a flushing process happens if the holding stamp 86 is moved. The magnet device 90, if present, may thereby be utilized as sensor for the position of the holding stamp 86. Since in this case the magnet device 90 is passive, it may act as an inductive position encoder with the holding body 86 as movable core. If the tensioning device is realized differently, an additional sensor may be arranged, which exemplarily be equal to the sensor 10 at the piston 74.

Figure 5:
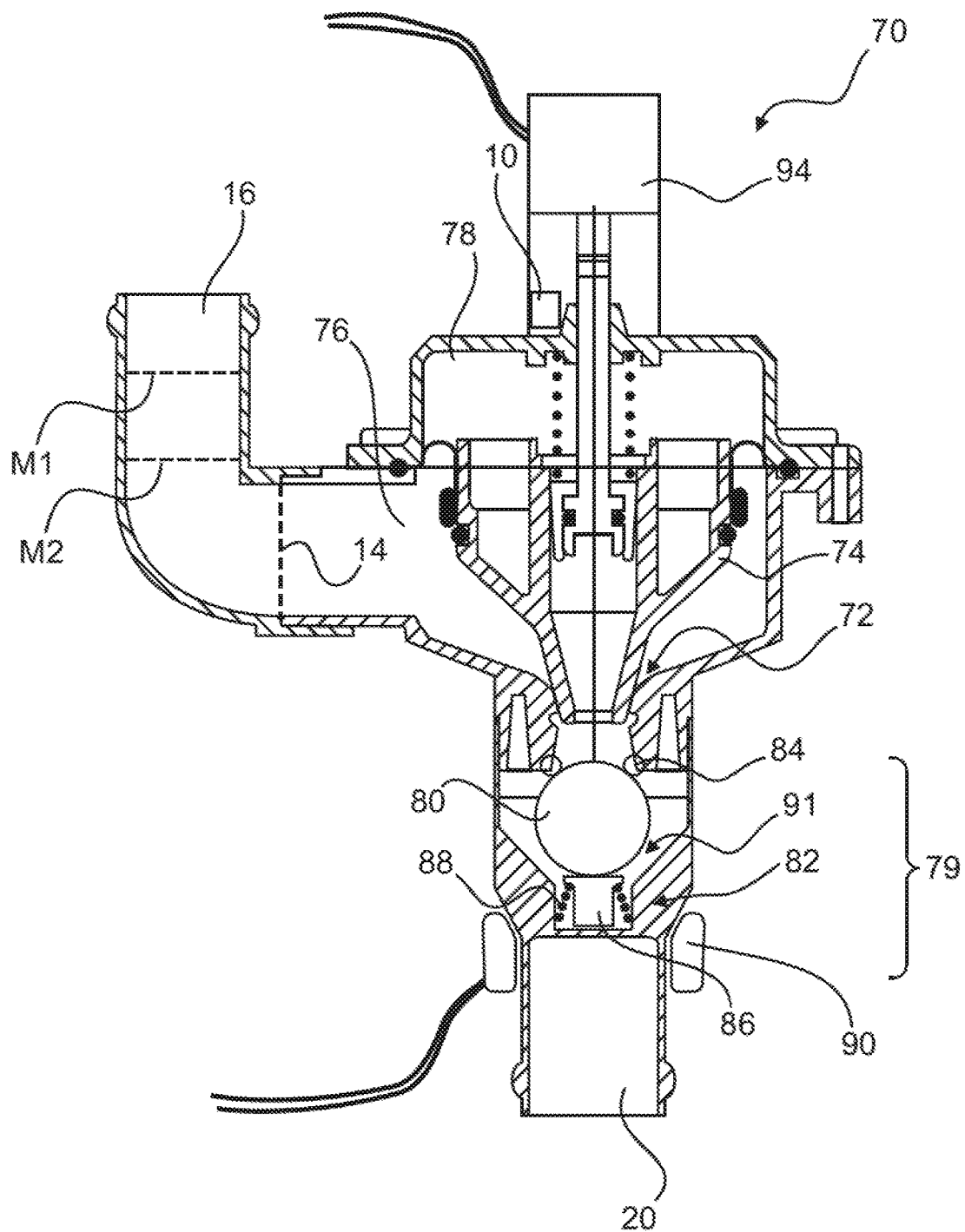
FIG. 5 shows a further exemplary design of a self-regulating valve in a schematic cross-sectional view.

Furthermore, FIG. 5 shows the self-regulating valve 70 from FIG. 4, at which the ring 92 is eliminated and instead a lifting device 94 is provided. This may exemplarily be realized as an electric magnet or an electric actuator and lifts the piston 74 during flushing of the self-regulating valve 70.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for disposing of fluid from a galley sink, comprising:
a galley sink for a galley cabin monument of a vehicle;
a self-regulating valve;
a control unit;
a sensor; and a first signal connection between the sensor and the control unit, wherein the input of the self-regulating valve is connected to a first fluid line, which is connected to a drainage opening of the galley sink at least indirectly, wherein the self-regulating valve is arranged underneath the drainage opening of the galley sink, such that fluid from the galley sink can flow through the associated drainage opening into the first fluid line, wherein the output of the self-regulating valve is configured to be couplable with a source of negative pressure at least indirectly, and wherein the self-regulating valve is configured to automatically open at a predetermined first amount M1 of fluid in the first fluid line, such that the self-regulating valve is in an opening state and that fluid can flow out of the first fluid line through the self-regulating valve, and to automatically close at a predetermined second amount M2 of fluid in the first fluid line, such that the self-regulating valve is in a closing state and that the predetermined second amount M2 of fluid remains in the first fluid line as a residual fluid amount, wherein the sensor is configured to detect the opening state or the closing state of the self-regulating valve, wherein the sensor is configured to transferring a sensor signal, which represents the state of the self-regulating valve to the control unit, and wherein the control unit is configured to provide at least one control signal based on the transferred sensor signal.

2. The system according to claim 1, further comprising:
a first controllable valve, whose output is at least indirectly couplable with a source of negative pressure for suctioning of fluid;
a fluid connection between an output of the self-regulating valve and an input of the first controllable valve; and
a second signal connection between the control unit and the first controllable valve,
wherein the control unit is configured for closing the first controllable valve through a transfer of a control signal to the first controllable valve, if and/or as soon as the self-regulating valve is in the closing state.

3. The system according claim 2, wherein the control unit is configured for opening the first controllable valve through a transfer of a control signal to the first controllable valve if and/or as soon as the self-regulating valve is in the opening state.

4. The system according to claim 2, further comprising:
an input unit; and
a signal connection between the input unit and the control unit,
wherein the control unit is controllable through the input unit in such a manner to open or to close the first controllable valve and/or to open or to close the second controllable valve.

5. The system according to claim 2, wherein the control unit is configured for receiving an instruction signal from a superordinate supervising unit,
wherein the control unit is controllable based on the instruction signal in a manner to open or to close the first controllable valve and/or to open or to close the second controllable valve.

6. The system according to any of the preceding claim 1, further comprising:
a water supply faucet for supplying of water into the galley sink;
a second controllable valve configured for controlling a water flow to the water supply faucet; and
a third signal connection between the control unit and the second controllable valve, wherein the control unit is configured for opening the second controllable valve through a transfer of a control signal to the second controllable valve if and/or as soon as the self-regulating valve is in the opening state.

7. The system according claim 6, wherein the control unit is configured for closing the second controllable valve through a transfer of a control signal to the second controllable valve is and/or as soon as the self-regulating valve is in the closing state.

8. The system according to claim 6, wherein the control unit is configured for closing the second controllable valve after the expiration of a delay time following the detected closing state of the self-regulating valve through a transfer of a control signal to the second controllable valve.

9. The system according to claim 1, further comprising a check valve directly upstream of the output.

10. The system according to claim 9, wherein the check valve comprises a selectively releasable tensioning device, which exerts an additional holding force into the floating ball in the direction of the seal seat.

11. A method for controlling a system according to claim 1, comprising:
detecting the state of the self-regulating valve; and
transferring the sensor signal from the sensor to the control unit, wherein the sensor signal represents the detected state of the self-regulating valve.

12. The method according to claim 11, further comprising: closing the first controllable valve through transferring a control signal from the control unit to the first controllable valve if and/or as soon as the self-regulating valve is in the closing state.

13. The method according to claim 11, further comprising: opening the first controllable valve through transferring a control signal from the control unit to the first controllable valve, if and/or as soon as the self-regulating valve is in the opening state.

14. The method according to claim 11, further comprising: opening the second controllable valve through transferring a control signal from the control unit to the second controllable valve if and/or as soon as the self-regulating valve is in the opening state.

15. The method according to claim 11, further comprising: closing the second controllable valve through transferring a control signal from the control unit to the second controllable valve if and/or as soon as the self-regulating valve is in the closing state.

16. The method according to claim 11, further comprising: closing the second controllable valve after the expiration of a delay time following the detected closing state of the self-regulating valve through transferring a control signal from the control unit to the second controllable valve.

17. A vehicle having a system for disposing of fluid from a galley sink, comprising:
a galley sink for a galley cabin monument of a vehicle;
a self-regulating valve;
a control unit;
a sensor; and
a first signal connection between the sensor and the control unit,
wherein the input of the self-regulating valve is connected to a first fluid line, which is connected to a drainage opening of the galley sink at least indirectly, wherein the self-regulating valve is arranged underneath the drainage opening of the galley sink, such that fluid from the galley sink can flow through the associated drainage opening into the first fluid line, wherein the output of the self-regulating valve is configured to be couplable with a source of negative pressure at least indirectly, and wherein the self-regulating valve is configured to automatically open at a predetermined first amount $M1$ of fluid in the first fluid line, such that the self-regulating valve is in an opening state and that fluid can flow out of the first fluid line through the self-regulating valve, and to automatically close at a predetermined second amount $M2$ of fluid in the first fluid line, such that the self-regulating valve is in a closing state and that the predetermined second amount $M2$ of fluid remains in the first fluid line as a residual fluid amount, wherein the sensor is configured to detect the opening state or the closing state of the self-regulating valve, wherein the sensor is configured to transferring a sensor signal, which represents the state of the self-regulating valve to the control unit, and wherein the control unit is configured to provide at least one control signal based on the transferred sensor signal.

* * * * *